Patented Jan. 14, 1930

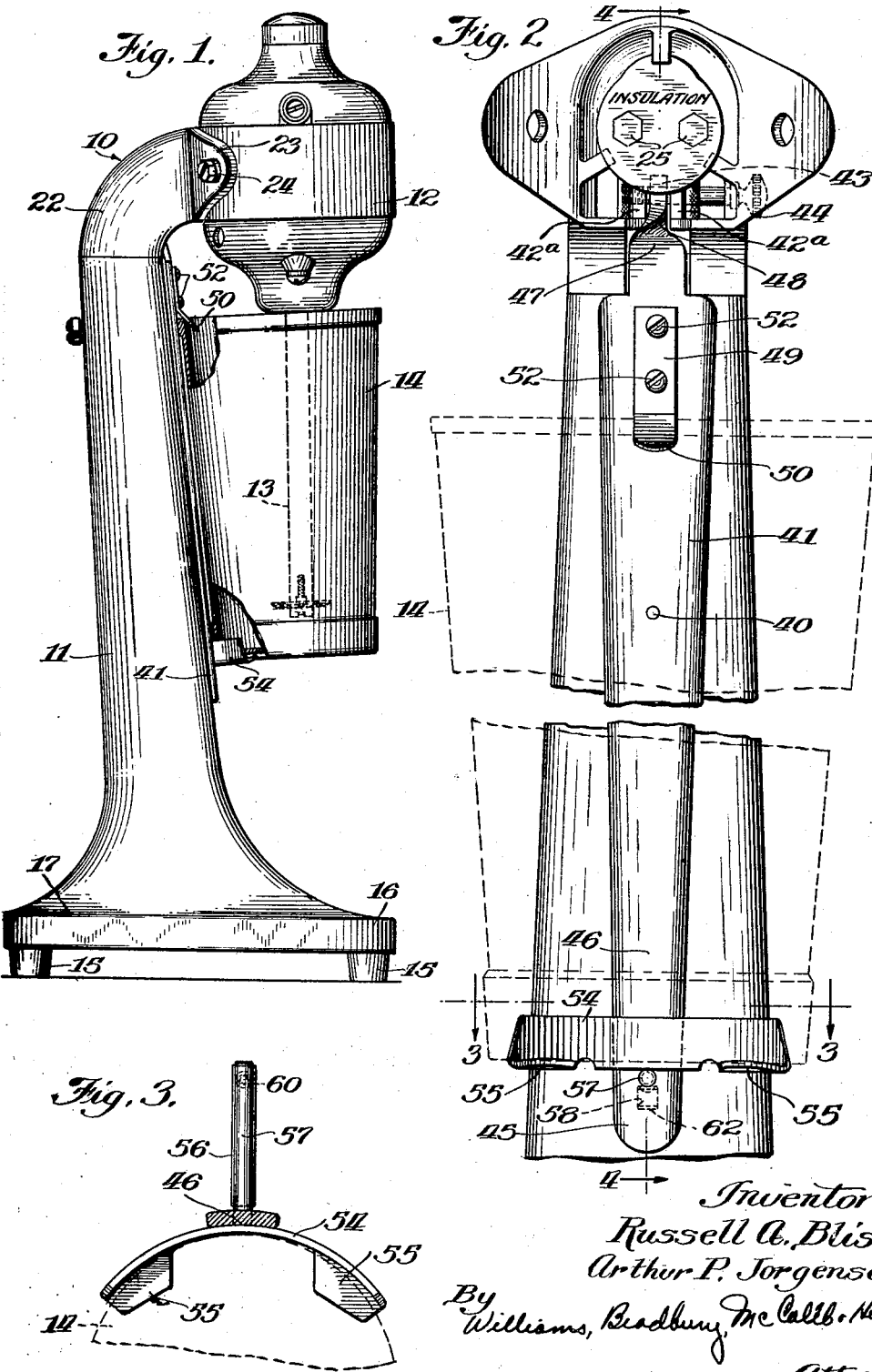

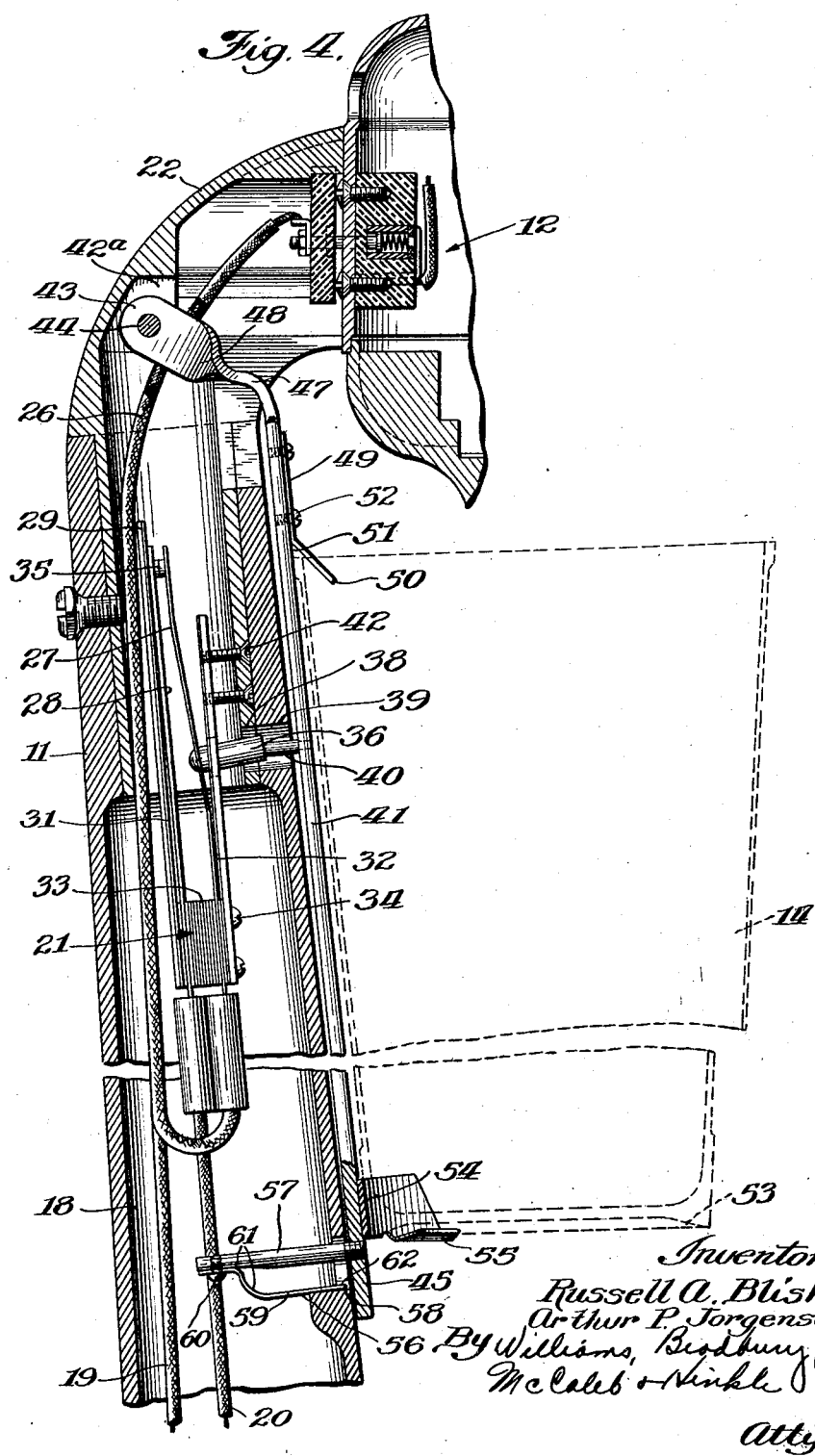

1,743,105

UNITED STATES PATENT OFFICE

RUSSELL A. BLISH AND ARTHUR P. JORGENSON, OF RACINE, WISCONSIN, ASSIGNORS TO ARNOLD ELECTRIC CO., OF RACINE, WISCONSIN, A CORPORATION OF WISCONSIN

DRINK MIXER

Application filed May 4, 1929. Serial No. 360,455.

The present invention relates to drink mixers, and is particularly concerned with drink mixers adapted to be actuated by the placing of a receptacle in operative position, or by the weight of the receptacle or its contents.

In drink mixers of this type, it is highly desirable that the receptacle be firmly secured in operative position about the mixer agitator to prevent rattling, splashing or spilling, and it is also desirable that the motor control switch be positively actuated to prevent vibration of the contacts and the consequent arcing which results in burning and pitting the contacts.

It is also necessary to reduce to a minimum of operations or movements required in the use of the mixer, so that an operator may serve a greater number of people with a minimum expenditure of time and effort, and consequently the device employed to accomplish the foregoing results should preferably be actuated coincident to the placing of the receptacle in operative position, as by the act of placing the receptacle or by the weight of the receptacle or its contents.

One of the objects of the present invention is the provision of a drink mixer which includes common means actuated by the placing of the receptacle for simultaneously securing the receptacle in operative position and accomplishing positive actuation of the motor control switch.

Another object is the provision of a drink mixer having means actuated by the removal of the receptacle for releasing said receptacle and for releasing a motor control switch which is positively secured in closed position during the operation of the mixer.

Another object is the provision of a drink mixer having a pivoted receptacle support adapted to be actuated by the weight of a receptacle or its contents to close a motor control switch and means carried by said receptacle support for assisting said receptacle and contents in positively holding said switch in closed position to prevent vibration.

Other objects and advantages of the invention will be apparent from the following description and from the accompanying drawings, in which similar characters of reference indicate similar parts throughout the several views.

Referring to the drawings, of which there are two sheets:

Fig. 1 is a side elevational view of the drink mixer and receptacle with the parts in the operative position of the mixer; that is, with the switch closed and the motor running;

Fig. 2 is a front elevational view of the standard and receptacle support with the motor removed, and the receptacle in dotted lines;

Fig. 3 is a sectional view taken on the plane of the line 3—3 of Fig. 2;

Fig. 4 is a sectional view taken on the plane of the line 4—4 of Fig. 2.

Referring to Fig. 1, 10 indicates the drink mixer assembly in its entirety, the mixer preferably including a support or standard 11, a motor 12, an agitator 13 driven by the motor 12 and a receptacle 14.

In the embodiment chosen to illustrate the invention, the standard 11 comprises a cast metal base 17 having rubber feet 15 and a pair of forwardly extending portions 16 for guiding the receptacle into operative position. The base 17 is provided with a hollow interior conduit 18 for receiving the conductors 19 and 20 leading to a supply circuit, and for receiving an electric switch 21 for controlling the motor circuit. The standard 11 may be provided with a separate motor head 22 comprising a hollow cast metal member having a pair of curved attaching flanges 23 for engaging the casing of the motor 12 and for securing said motor to the standard by a pair of bolts 24. The motor head 22 is provided with contacts 25 adapted to engage contacts carried by the motor 12 and one conductor 19 may be connected to one of the contacts 25. The other contact 25 is connected by a conductor 26 to a movable switch contact 27, while the supply conductor 20 is connected to the fixed switch contact 28 so that the switch contacts are adapted to make and break the motor circuit.

The switch 21 may comprise a frame consisting of a pair of metal plates 29 and 30 separated by layers of insulation 31 and 32 from the resilient contact members 27 and

28. The metal plates 29 and 30, contact members 27 and 28 and the spacing members 33 of insulation may all be clamped together by a pair of screw bolts 34 passing through the plate 30, contacts and insulation and threaded into the plate 29, it being understood that the contact springs 27 and 28 are provided with enlarged apertures about the bolts 34 to effectively insulate the contact springs from each other and from the supporting plates.

The contact springs 27 and 28 may be provided with aligned contact points 35 and the movable contact spring 27 is provided with an actuating member or button 36 adapted to project through an aperture 38 in plate 20 and an aperture 39 in the standard 11 so that it may be engaged by a pin 40 carried by the receptacle support 41.

The switch 21 may be secured in the standard by a pair of screw bolts 42 passing through the neck of the motor head 22 and threaded into the plate 30, drawing the edges of the plate into engagement with the substantially cylindrical bore or conduit in the motor head 22.

The motor head 22 is provided upon its interior with a pair of forwardly projecting lugs 42ª spaced to receive the end 43 of motor support 41 and one of the lugs 42ª may be threaded to receive the end of a screw bolt 44 adapted to project into the motor head 22 through the lugs 41 for pivotally supporting the end 43 of motor support 41. In some embodiments of the invention, the motor head and base 17 may constitute an integral piece, but the provision of a separate motor head facilitates the assembly of the parts of the device with a minimum expenditure of time and labor.

It should also be understood that the present invention is not limited to the use of a specific type of receptacle support and other types of receptacle carriers may be used within the scope of the appended claims.

The receptacle support 41 comprises an elongated strip of sheet metal which may taper toward its lower end 45 and the receptacle support may be laterally curved to present a concave face 46 for better receiving the complementary surface upon the receptacle 14.

At its upper end the lever 41 is bent at 47 so that the upper end 43 may extend into the standard 11, while the main body of the lever 41 extends longitudinally of the standard. The end 43 may also be twisted at 48 through an angle of substantially 90 degrees, so that the end 43 may lie in a plane at right angles to the bolt 44 which pivotally supports this end of the lever.

The receptacle support or lever 41 is provided adjacent its upper end with means for engaging an upper part of the receptacle 14, which may comprise a sheet metal member 49 having a downwardly and forwardly projecting flange 50 for guiding the edge of the receptacle 14 into the slot 51 formed between said flange 50 and lever 41. The retaining member 49 is secured to the receptacle support 41 by any convenient fastening means such as a pair of screw bolts 52.

The receptacle 14 preferably comprises a sheet metal member of substantially the shape shown, which is provided with a depending annular shoulder 53 upon its bottom adjacent the outer edge. In the present embodiment, the annular shoulder 53 comprises a substantially frusto-conical portion, but any equivalent shape of shoulder may be used.

When the receptacle 14 is not in the operative position shown in Figs. 1 and 3, the receptacle support 41 is resiliently urged away from the standard 11 by the contact spring 27 acting through the pins 36 and 40 and the contact points 35 are open.

The receptacle support 41 is also provided at its lower end 45 with means for supporting a receptacle 14 which may consist of a strip of sheet metal 54 concavely curved to correspond to the curvature of the bottom of the receptacle 14 and transversely secured to the receptacle support 41 by welding, soldering or other convenient fastening means. The strip 54 is provided at its lower edge adjacent each end, with a radially projecting and upwardly sloping flange 55 which is adapted to engage the frusto-conical shoulder 53 of the receptacle. Either or both of the flanges 55, 50 may be made resilient if desired to resiliently clamp the receptacle, or sufficient tolerance may be provided between these members if it is desired to use rigid flanges. In either case, the receptacle 14 is provided with a three-point support comprising flanges 50, 55 for retaining the receptacle upon the support 41.

When the receptacle is not upon the receptacle support 41, the pressure of the movable contact spring 27 is sufficient to urge the receptacle support 41 away from standard 11. The receptacle support 41 is preferably provided with means for limiting the motion of the receptacle support 41 away from the standard 11 and for positively securing the switch 21 in closed position, comprising a frictional device indicated in its entirety at 56.

The frictional device 56 may consist of a pin 57 secured to receptacle support 41 and adapted to project into the standard through an aperture 58. At its inner end, the pin 57 may carry a resilient spring leaf 59 by means of a screw bolt 60 and the spring leaf 59 may be bent as at 61 to bring the leaf into engagement with the standard 11 adjacent the aperture 58. The amount of friction interposed by the spring leaf 59 depends upon its tension and surface, but the spring is preferably so formed that only sufficient friction is interposed to hold the switch contacts in closed position with the assistance of the weight of the receptacle 14 and contents.

The end 62 of spring leaf 59 may slope upward from the curved portion 61 so that the friction increases as the receptacle support 41 pivots counter-clockwise and the spring 59 is also adapted to limit outward movement of the receptacle support from the standard 11.

The operation of the drink mixer is as follows.

When the receptacle 14 is removed from its support, the receptacle support 41 is in receptive position with its lower end slightly spaced from the standard 11, being urged to this position by the movable contact spring 27 and held in this position by the spring leaf 59. The receptacle 14 may be inserted below the agitator 13 with the upper edge of the receptacle between the agitator and the flanges 55 and upward movement of the receptacle may be continued until its upper edge is inserted in the slot 51 between member 49 and receptacle support 41.

The bottom of the receptacle may then be pivoted counter-clockwise to the position of Figs. 1 or 4 and the receptacle may either be slid past the flanges 55, if they are resilient, or lifted over them if rigid flanges are provided with sufficient clearance to permit this motion.

The placing of the receptacle upon the support 41 will simultaneously move the receptacle support in a clockwise direction, closing contact points 45, and the combined weight of the receptacle and friction interposed by the spring leaf 59 are sufficient to hold the contacts in closed position without any possibility of vibration, which would cause arcing or pitting of the contacts.

The receptacle 14 may be removed from the support 41 by a reverse motion, after which the receptacle support 41 will be pivoted outward by the act of removing the receptacle or by the action of the movable spring contact 27 and the motor will be stopped.

It will thus be observed that the present device is adapted to insure the positive actuation of the switch and to prevent vibration of the switch contacts due to the vibration incident to the operation of a motor. The device is also adapted to securely fasten the receptacle in operative position, so that there is no possibility of spilling or splashing.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a drink mixer, the combination of a standard with a motor control switch and a receptacle carrier for actuating said switch, means on said carrier for holding a receptacle, and friction means for holding said carrier in any adjusted position.

2. In a drink mixer, the combination of a standard with a motor control switch and a receptacle carrier for actuating said switch, means on said carrier for holding a receptacle, and friction means for holding said carrier in any adjusted position comprising a resilient member carried by said receptacle carried for frictionally engaging said standard.

3. In a drink mixer, the combination of a standard with a motor carried thereby, a motor switch for controlling said motor, a receptacle support pivotally mounted on said standard and adapted to actuate said motor switch, said switch being adapted to urge said receptacle support away from said standard, and means for securing said switch in closed position comprising a receptacle and means carried by said support for frictionally engaging said standard.

4. In a drink mixer, the combination of a supporting member with a motor control switch, a carrier member for supporting a receptacle for said drink mixer, means on said carrier member for holding a receptacle, operative mechanical connections between said carrier member and said motor control switch, and friction means carried by one of said members for engaging the other of said members for holding said carrier in any adjusted position.

5. In a drink mixer, the combination of a supporting member with a motor control switch, a carrier member for supporting a receptacle for said drink mixer, means on said carrier member for holding a receptacle, operative mechanical connections between said carrier member and said motor control switch, and friction means carried by one of said members for engaging the other of said members for holding said carrier in any adjusted position, said friction means comprising a resilient metal spring, carried by one member for sliding engagement with the other of said members.

In witness whereof, we hereunto subscribe our names this 30th day of April, 1929.
RUSSELL A. BLISH.
ARTHUR P. JORGENSON.